(12) United States Patent
Wang et al.

(10) Patent No.: US 12,717,531 B2
(45) Date of Patent: Aug. 25, 2026

(54) IMAGE GENERATING DEVICE AND COMMUNICATION CIRCUIT THEREOF

(71) Applicant: Coretronic Corporation, Hsin-Chu (TW)

(72) Inventors: Nien-Hung Wang, Hsin-Chu (TW); Jeng-An Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 21 days.

(21) Appl. No.: 18/741,690

(22) Filed: Jun. 12, 2024

(65) Prior Publication Data

US 2024/0419383 A1 Dec. 19, 2024

(30) Foreign Application Priority Data

Jun. 14, 2023 (CN) ........................ 202310700673.7

(51) Int. Cl.
*G06F 3/14* (2006.01)
*G09G 5/00* (2006.01)

(52) U.S. Cl.
CPC ............... *G06F 3/14* (2013.01); *G09G 5/006* (2013.01); *G09G 2370/12* (2013.01)

(58) Field of Classification Search
CPC ...... G06F 3/14; G09G 5/006; G09G 2370/12; H04N 21/4425; H04N 17/04
See application file for complete search history.

(56) References Cited

U.S. PATENT DOCUMENTS 9,035,676 B2 * 5/2015 Xu ........................... H04N 5/66 327/333
2013/0002299 A1 * 1/2013 Hung ............ H03K 19/017509 326/63

FOREIGN PATENT DOCUMENTS

CN 212256299 12/2020
TW I611697 1/2018

* cited by examiner

*Primary Examiner* — Daniel D Chang
(74) *Attorney, Agent, or Firm* — JCIPRNET

(57) ABSTRACT

Disclosed are an image generating device and a communication circuit thereof. The communication circuit includes a first pull-up resistor, an unidirectional current component, a signal isolation component and a signal switch. The first pull-up resistor receives a standby voltage. The unidirectional current component is coupled between the first pull-up resistor and a (CEC) pin. The signal isolation component is coupled to a path between the pin CEC and the signal switch, where a first end of the signal isolation component is controlled by the standby voltage. The signal switch is coupled to a second end of the signal isolation component, and the signal switch couples the second end of the signal isolation component to a second pull-up resistor of a processor or the signal switch couples the second end of the signal isolation component to a third pull-up resistor of a port according to a system voltage.

20 Claims, 7 Drawing Sheets

IMAGE GENERATING DEVICE AND COMMUNICATION CIRCUIT THEREOF

CROSS-REFERENCE TO RELATED APPLICATION

This application claims the priority benefit of China application serial no. 202310700673.7, filed on Jun. 14, 2023. The entirety of the above-mentioned patent application is hereby incorporated by reference herein and made a part of this specification.

BACKGROUND

Technical Field

The disclosure relates to an image generating device and a communication circuit thereof, and in particular to an image generating device and a communication circuit thereof that may comply with the high definition multimedia interface (HDMI) test specification.

Description of Related Art

High definition multimedia interface (HDMI) is a common video/audio control streaming interface. In order to allow electronic devices to be complied with each other without interfering with each other, the HDMI Association has developed a compliance test specification (CTS). The consumer electronics control (CEC) protocol in the high definition multimedia interface allows users to control all connected devices through the high definition multimedia interface with a remote controller. For example, when a first electronic device is turned on using the remote controller of the first electronic device, a second electronic device connected to the first electronic device is also turned on at the same time. The testing purpose related to consumer electronics control is to design some test methods to ensure that the first electronic device under test does not interfere with the second electronic device connected by the high definition multimedia interface no matter the first electronic device is in the power-off state, the standby state, or the power-on state. The relevant test method is described below.

Please refer to FIGS. 5A to 5C. In the implementation of the test items related to items 8-14 of the high definition multimedia interface compliance test specification, a test item of Vcec1, as shown in FIG. 5A, is a test to connect the pin CEC of the first electronic device to a reference ground voltage through a pull-down resistor (for example, 1 megohm), and confirm whether the test voltage Vcec1 is interfering with the second electronic device when the first electronic device is in the power-off state, the standby state, and the power-on state. A test item of Vcec1.5, as shown in FIG. 5B, is a test to connect the pin CEC of the first electronic device to a supply voltage (for example, 3.3V) through a pull-up resistor (for example, 27 kilohms) to confirm whether the test voltage Vcec1.5 is interfering with the second device when the first electronic device is in the power-off state, the standby state, and the power-on state. A test item of Vcec2, as shown in FIG. 5C, is a test to connect the pin CEC of the first electronic device to a voltage divider circuit. One side of the voltage divider circuit is connected to a reference ground voltage through a resistor (for example, 1 kilohms), and the other side is connected to a supply voltage (for example, 3.3V) through a resistor (for example, 27 kilohms) to confirm whether the test voltage Vcec2 is interfering with the second device when the first electronic device is in the power-off state, the standby state, and the power-on state. The standards of test voltages Vcec1, Vcec1.5 and Vcec2 are as follows:

| Test item | Standard |
|---|---|
| Vcec1 | 0 V < Vcec1 < 0.1 V or 2.88 V < Vcec1 <= 3.63 V |
| Vcec1.5 | 3.3 V +− 10% |
| Vcec2 | (1)If Vcec1 falls in the standard of 0 V-0.1 V, the standard of Vcec2 is 0.1056 V < Vcec2 < 0.1344 V.<br>(2)If Vcec1 falls in the standard of 2.88 V-3.63 V, the standard of Vcec2 is 0.196 V < Vcec2 < 0.274 V. |

In the conventional technology, when the first electronic device is in the power-off state or the standby state, the external power (the power connected to the first electronic device) may lead to a leakage current by flowing through the pull-up resistor in the first electronic device under test through the pin. The leakage current may cause the leakage current item of the high-definition multimedia interface compatibility test to fail, and may cause abnormities in a boot process of the first electronic device, resulting in a process abnormity in the first electronic device. In addition, when conducting the test item of Vcec2, the first electronic device is affected by the two pull-up resistors inside the electronic device (not shown), so that the first electronic device may not meet the standard (2) in both standby state and power-on state. That is to say, the test voltage Vcec2 cannot be between 0.196V and 0.274V under the standby state and the power-on state, and fails to meet the standard of "If Vcec1 falls in the standard of 2.88V~3.63V, the standard of Vcec2 is 0.196V<Vcec2<0.274V" in the test item of Vcec2. The first electronic device in above may be, for example, a projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an image generating device and a communication circuit thereof, which may effectively pass the consumer electronics control (CEC) test in the high definition multimedia interface.

Other objectives and advantages of the disclosure may further be learned from technical features disclosed in the disclosure.

In order to achieve one or a portion of or all of the objects or other objects, the communication circuit of the disclosure is coupled to a pin of a high definition multimedia interface. The communication circuit includes a first pull-up resistor, an unidirectional current component, a signal isolation component and a signal switch. The first pull-up resistor receives a standby voltage. The unidirectional current component is coupled between the first pull-up resistor and the pin. The signal isolation component is coupled on a path between the pin and the signal switch. The signal isolation component has a first end and a second end. The first end of the signal isolation component is coupled to the pin. The signal isolation component is controlled by the standby voltage. The signal switch is coupled to the second end of the signal isolation component. The signal switch couples the second end of the signal isolation component to a second pull-up resistor of a processor or the signal switch couples the second end of the signal isolation component to a third pull-up resistor of a port according to a system voltage.

In order to achieve one or a portion of or all of the objects or other objects, the image generating device of the disclosure includes a high definition multimedia interface, a processor, a signal receiver and a communication circuit. The high definition multimedia interface has a pin. The signal receiver has a port. The communication circuit is coupled to the pin. The communication circuit includes: a first pull-up resistor, an unidirectional current component, a signal isolation component and a signal switch. The first pull-up resistor receives a standby voltage. The unidirectional current component is coupled between the first pull-up resistor and the pin. The signal isolation component is coupled on a path between the pin and the signal switch. The signal isolation component has a first end and a second end. The first end of the signal isolation component is coupled to the pin. The signal isolation component is controlled by the standby voltage. The signal switch is coupled to the second end of the signal isolation component. The signal switch couples the second end of the signal isolation component to a second pull-up resistor of the processor or the signal switch couples the second end of the signal isolation component to a third pull-up resistor of the port.

Based on the above, the communication circuit of the embodiment of the disclosure has the signal switch. The signal switch may select the pull-up resistor connected to the pin according to the presence or absence of the system voltage, so as to complete the relevant test operation. Moreover, the communication circuit of the embodiment of the disclosure is equipped with the signal isolation component, which may solve the issue of the interference between the pull-up resistors in the path of the pin.

In order to make the above-mentioned features and advantages of the disclosure more comprehensible, the following specific embodiments are described in detail together with the accompanying drawings.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
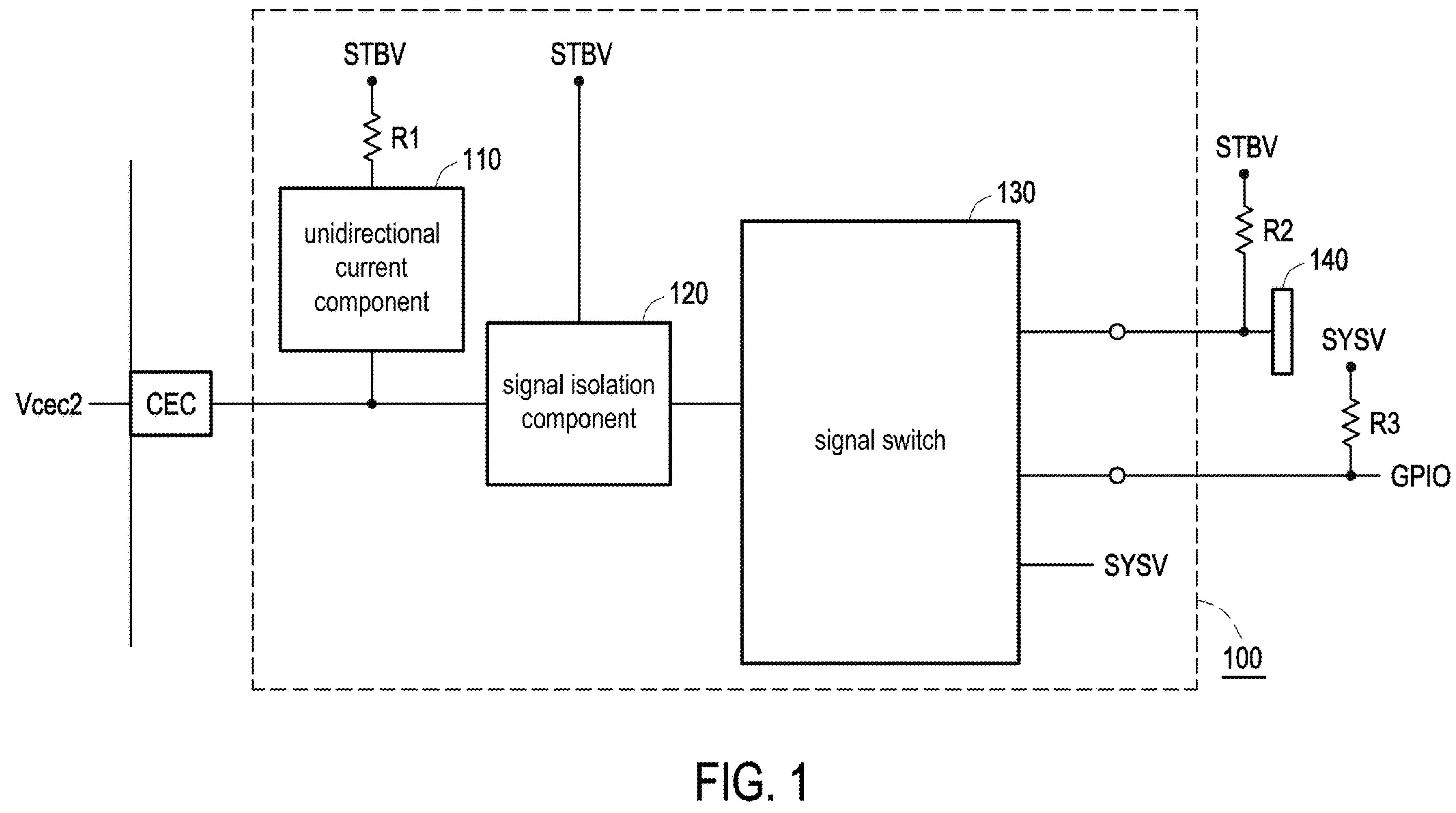
FIG. 1 is a schematic diagram of a communication circuit of an embodiment of the disclosure.

Please refer to FIG. 1. FIG. 1 is a schematic diagram of a communication circuit of an embodiment of the disclosure. A communication circuit 100 is coupled to a pin CEC of a high definition multimedia interface (HDMI), and is coupled to a processor 140 and a port GPIO, so as to execute a test item relating to a high definition multimedia interface compliance test specification (CTS) No. 8 to No. 14. In this embodiment, the communication circuit 100 includes a first pull-up resistor R1, an unidirectional current component 110, a signal isolation component 120 and a signal switch 130. An end of the first pull-up resistor R1 receives a standby voltage STBV. The other end of the first pull-up resistor R1 is coupled to the unidirectional current component 110. The unidirectional current component 110 is coupled between the first pull-up resistor R1 and the pin CEC. The unidirectional current component 110 is used to limit a direction of a current flow of the first pull-up resistor R1. The signal isolation component 120 is coupled to a path between the pin CEC and the signal switch 130, in which a first end of the signal isolation component 120 is coupled to the pin CEC, and a second end of the signal isolation component 120 may be coupled to the signal switch 130. The signal isolation component 120 receives the standby voltage STBV, and determines whether to cut off the path between the pin CEC and the signal switch 130 according to the standby voltage STBV.

In addition, the signal switch 130 receives a system voltage SYSV, and is used to couple the second end of the signal isolation component 120 to a second pull-up resistor R2 of the processor 140 according to the system voltage SYSV, or to couple the second end of the signal isolation component 120 to a third pull-up resistor R3 of the port GPIO. The second pull-up resistor R2 of the processor 140 receives the standby voltage STBV, and the third pull-up resistor R3 of the port GPIO receives the system voltage SYSV.

In this embodiment, in a test mode, the communication circuit 100 may receive a test voltage Vcec2 through the pin CEC. In the test mode of a standby state, the standby voltage STBV may be a normal voltage, and the system voltage SYSV may be a reference ground voltage. In this embodiment, the reference ground voltage may be 0 volt, and the normal voltage may be a voltage sufficient for the processor 140 to operate, such as 3.3 volts, but not limited thereto. At the same time, based on the standby voltage STBV, which is the normal voltage, the signal isolation component 120 may turn on the path between the pin CEC and the signal switch 130. That is, the test voltage Vcec2 may be transmitted to the signal switch 130 through the signal isolation component 120. On the other hand, the signal switch 130 may couple the second end of the signal isolation component 120 to the second pull-up resistor R2 of the processor 140 according to the system voltage SYSV, which is the reference ground voltage.

In the test mode of the standby state, the unidirectional current component 110 may maintain the current on the first pull-up resistor R1 as flowing from the end of the first pull-up resistor R1 receiving the standby voltage STBV to the pin CEC. At this time, the signal isolation component 120 may turn on the path between the pin CEC and the signal switch 130 due to receiving the voltage standby voltage STBV, which is the normal voltage. The signal switch 130 may couple the second end of the signal isolation component 120 to the second pull-up resistor R2 of the processor 140 based on the system voltage SYSV, which is the reference ground voltage. In this way, there may be the first pull-up resistor R1 and the second pull-up resistor R2 connected in parallel on the path coupled by the pin CEC. Both the first pull-up resistor R1 and the second pull-up resistor R2 are resistors that may be adjusted externally. Therefore, in the test mode of the standby state, by adjusting a resistance value of the pull-up resistors R1 and/or R2, the tested high definition multimedia interface may meet the test specification.

It is worth mentioning that in the test mode of the standby state, since the signal switch 130 cuts off the connection between the third pull-up resistor R3 of the port GPIO and the signal isolation component 120, the third pull-up resistor R3 do not affect the test operation in the test mode of the standby state.

On the other hand, in the test mode of a power-on state, both the standby voltage STBV and the system voltage SYSV may be the normal voltage. Likewise, in this embodiment, the normal voltage may be the voltage sufficient to enable the port GPIO to operate, such as 3.3 volts, but not limited thereto.

At this time, both the unidirectional current component 110 and the signal isolation component 120 maintain the same operation as in the test mode of the standby state, which will not be repeated here. The signal switch 130 may couple the second end of the signal isolation component 120 to the third pull-up resistor R3 of the port GPIO according to the system voltage SYSV, which is the normal voltage, and cut off the connecting path between the second end of the signal isolation component 120 and the second pull-up resistor R2 of the processor 140. In this way, there may be the first pull-up resistor R1 and the third pull-up resistor R3 connected in parallel on the path coupled to the pin CEC. The first pull-up resistor R1 is the resistor that may be adjusted externally. Therefore, in the test mode of the power-on state, by adjusting a resistance value of the first pull-up resistor R1, the tested high definition multimedia interface may meet the test specification.

It is worth mentioning that in order to ensure that the power provided by the external device connected to the pin CEC is not reversed to the processor 140, the communication circuit 100 of the embodiment of the disclosure provides the signal isolation component 120 to block the above-mentioned external power transmission path. In a power-off state, the signal isolation component 120 may receive the standby voltage STBV, which is the reference ground voltage (for example, 0V). The signal isolation component 120 may cut off the path between the pin CEC and the signal switch 130 based on the standby voltage STBV of 0 volt. Under such conditions, the processor 140 may be physically isolated from the pin CEC to ensure the security of the processor 140.

In some embodiments of the disclosure, the signal isolation component 120 may be a level shifter. Based on a circuit design of the level shifter, the first end of the signal isolation component 120 may be coupled to the first pull-up resistor R1. The first pull-up resistor R1 and the unidirectional current component 110 are connected in series. The unidirectional current component 110 is used to limit the direction of the current flow of the first pull-up resistor R1, and effectively prevent a reverse current when an external device provides power to the pin CEC.

Figure 2A:
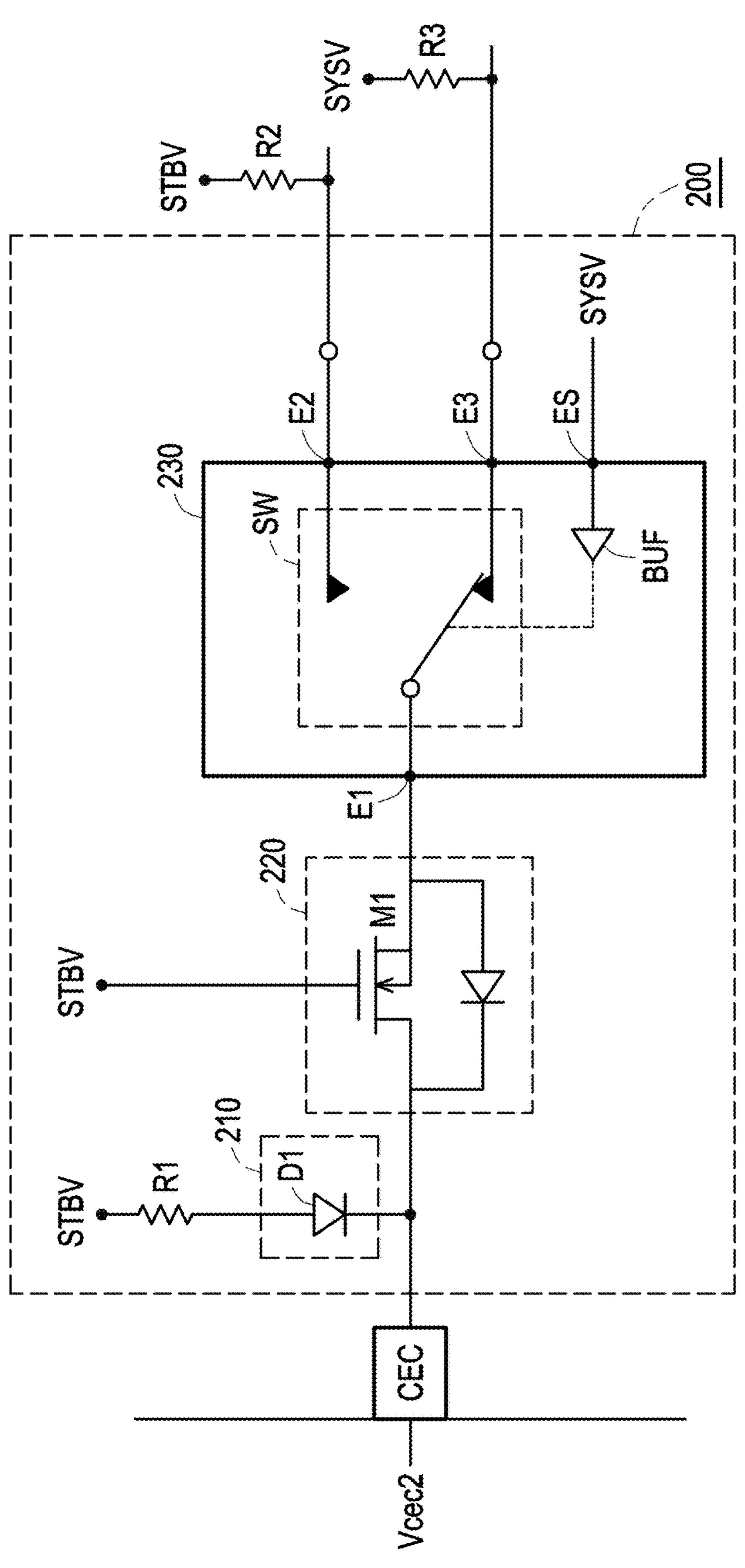
FIG. 2A and FIG. 2B respectively illustrate schematic diagrams of different implementations of the communication circuit of the embodiment of the disclosure.
Figure 2B:
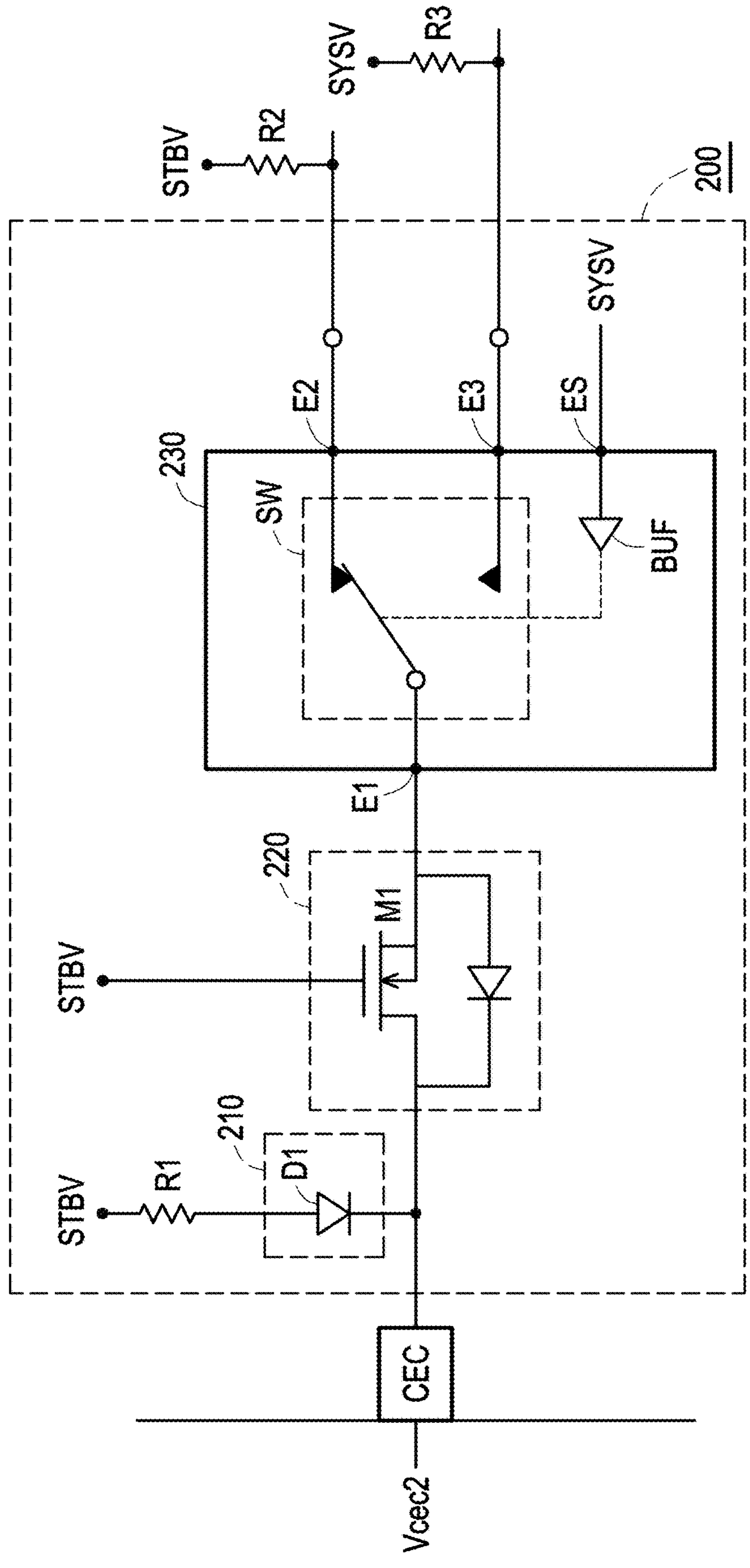

Please refer to both FIG. 2A and FIG. 2B. FIG. 2A and FIG. 2B respectively illustrate schematic diagrams of different implementations of the communication circuit of the embodiment of the disclosure. In FIG. 2A, a communication circuit 200 includes the first pull-up resistor R1, an unidirectional current component 210, a signal isolation component 220 and a signal switch 230. The first pull-up resistor R1 receives the standby voltage STBV, and the unidirectional current component 210 is coupled between the first pull-up resistor R1 and the pin CEC. The signal isolation component 220 is coupled on the path between the pin CEC and the signal switch 230. The pin CEC may be used to receive the test voltage Vcec2.

In this embodiment, the unidirectional current component 210 includes a diode D1. A positive electrode of the diode D1 is coupled to the first pull-up resistor R1, and a negative electrode of the diode D1 is coupled to the pin CEC. The diode D1 is used to limit the direction of the current flow of the first pull-up resistor R1. Specifically, when the diode D1 is turned on, the first pull-up resistor R1 may generate the current flowing from the end receiving the standby voltage STBV to the pin CEC. In contrast, when the diode D1 is turned off, the first pull-up resistor R1 do not generate current.

In addition, in this embodiment, the signal isolation component 220 is a switch constructed by a transistor M1. A first end of the transistor M1 is coupled to the pin CEC. A second end of the transistor M1 is coupled to the signal switch 230. A control end of the transistor M1 receives the standby voltage STBV. In this embodiment, the transistor M1 may be an N-type transistor. When the standby voltage STBV is the reference ground voltage, the transistor M1 may be turned off to cut off the path between the signal switch 230 and the pin CEC. When the standby voltage STBV is the normal voltage, the transistor M1 may be turned on to communicate with the path between the signal switch 230 and the pin CEC.

On the other hand, the signal switch 230 may be a multiplexer. The signal switch 230 may be implemented through a switch component SW and a buffer BUF. An end E1 of the signal switch 230 is coupled to a second end of the signal isolation component 220; an end E2 of the signal switch 230 is coupled to the second pull-up resistor R2; an end E3 of the signal switch 230 is coupled to the third pull-up resistor R3; and a selection end ES of the signal switch 230 receives the system voltage SYSV. The switch component SW is controlled by an output voltage of the buffer BUF. The pull-up resistors R2 and R3 respectively receive the standby voltage STBV and the system voltage SYSV.

In this embodiment, the system voltage SYSV is the normal voltage (for example, 3.3 volts). At this time, the buffer BUF may generate the output voltage which is also the normal voltage according to the system voltage SYSV. The switch component SW may be switched on or off according to the output voltage of the buffer BUF, and couple the end E1 to the end E3. That is to say, in this embodiment, through the switch component SW, the second end of the signal isolation component 220 may be coupled to the third pull-up resistor R3.

In the embodiment of FIG. 2B, the system voltage SYSV received by the signal switch 230 of the communication circuit 200 is the reference ground voltage (for example, 0 volts). At this time, the buffer BUF may generate the output voltage which is also the reference ground voltage. Therefore, the switch component SW may couple the end E1 to the end E2 according to the system voltage SYSV, which is the reference ground voltage. That is to say, in this embodiment, through the switch component SW, the second end of the signal isolation component 220 may be coupled to the second pull-up resistor R2.

In addition, the signal switch 230 in FIG. 2A and FIG. 2B may also be implemented by using other types of multiplexer circuits well known to those skilled in the art. A circuit scheme of the signal switch 230 shown in FIG. 2A and FIG. 2B is only an example for illustration and is not intended to limit the implementation scope of the disclosure.

Figure 3:
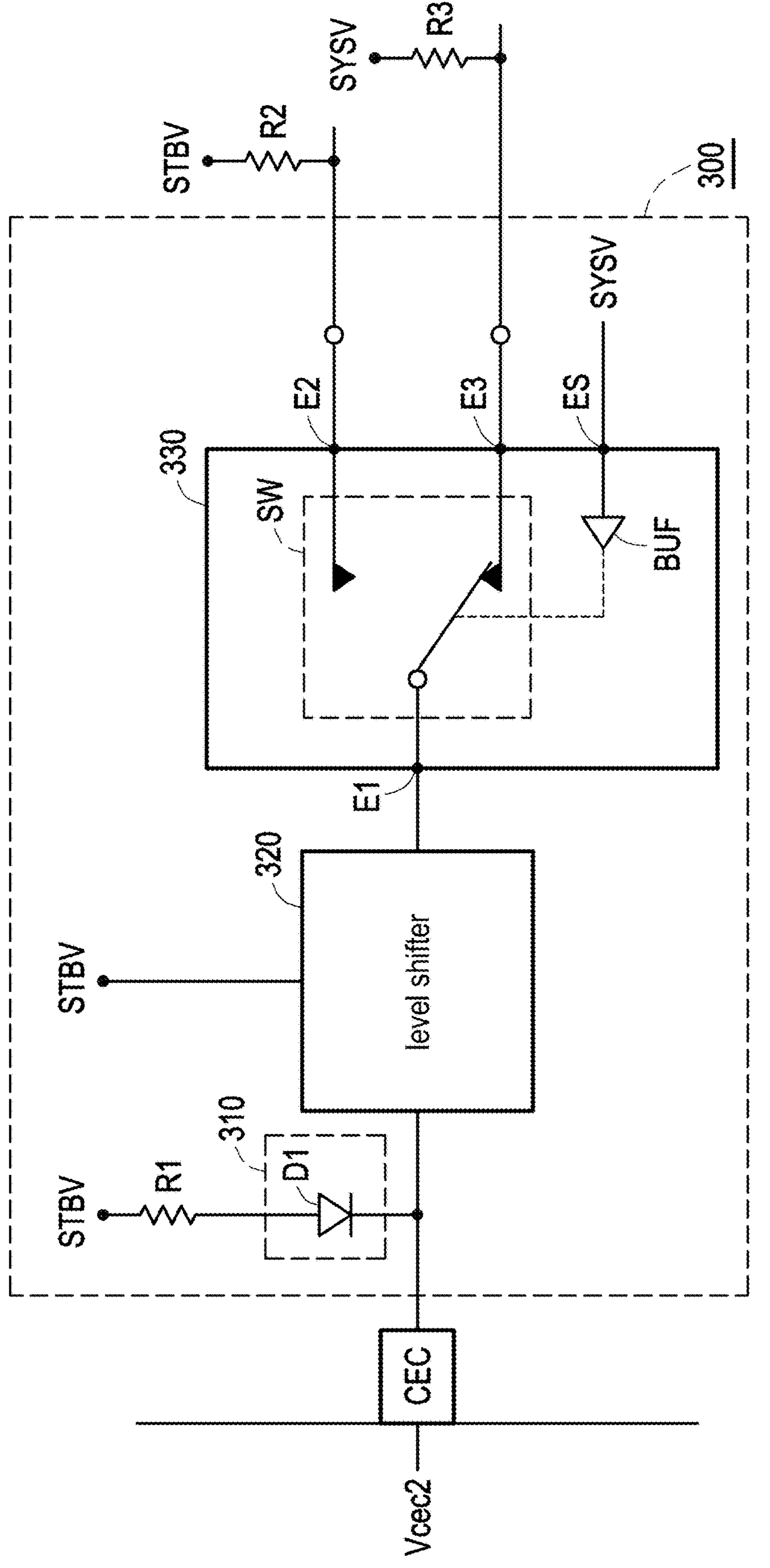
FIG. 3 is a schematic diagram of a communication circuit according to another embodiment of the disclosure.

Please refer to FIG. 3. FIG. 3 is a schematic diagram of a communication circuit according to another embodiment of the disclosure. A communication circuit 300 includes the first pull-up resistor R1, an unidirectional current component 310, a level shifter 320 and a signal switch 330. One end of the first pull-up resistor R1 receives the standby voltage STBV, and another end of the first pull-up resistor R1 is coupled to the unidirectional current component 310. The unidirectional current component 310 is coupled between the first pull-up resistor R1 and the pin CEC. The level shifter 320 is coupled on the path between the pin CEC and the signal switch 330. A first end of the level shifter 320 is coupled to the pin CEC. A second end of the level shifter 320 may be coupled to the signal switch 330.

In this embodiment, the level shifter 320 is used as the signal isolation component. The level shifter 320 receives the standby voltage STBV, and determines whether to cut off the path between the pin CEC and the signal switch 330 according to the standby voltage STBV. When the standby voltage STBV is the reference ground voltage, the level shifter 320 may cut off the path between the pin CEC and the signal switch 330. When the standby voltage STBV is the normal voltage, the level shifter 320 may communicate with the path between the pin CEC and the signal switch 330, shift the voltage value of the test voltage Vcec2 on the pin CEC, and provide the shifted test voltage to the signal switch 330. The voltages at both ends of the level shifter 320 may be shifted according to the first pull-up resistor R1, the second pull-up resistor R2, or be shifted according to the first pull-up resistor R1 and the third pull-up resistor R3.

It is worth mentioning that the level shifter 320 may be implemented by any level shifting circuit well known to those skilled in the art, and there is no specific limitation.

Figure 4A:
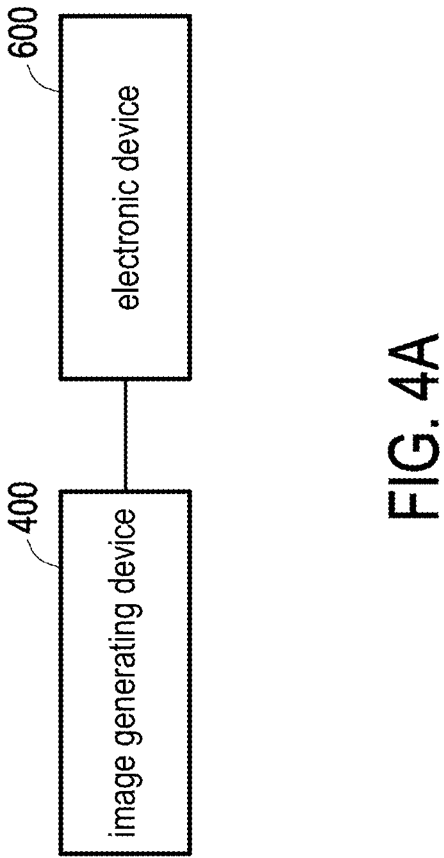
FIG. 4A illustrates a schematic diagram of the connection between an image generating device and an electronic device in an embodiment of the disclosure.
Figure 4B:
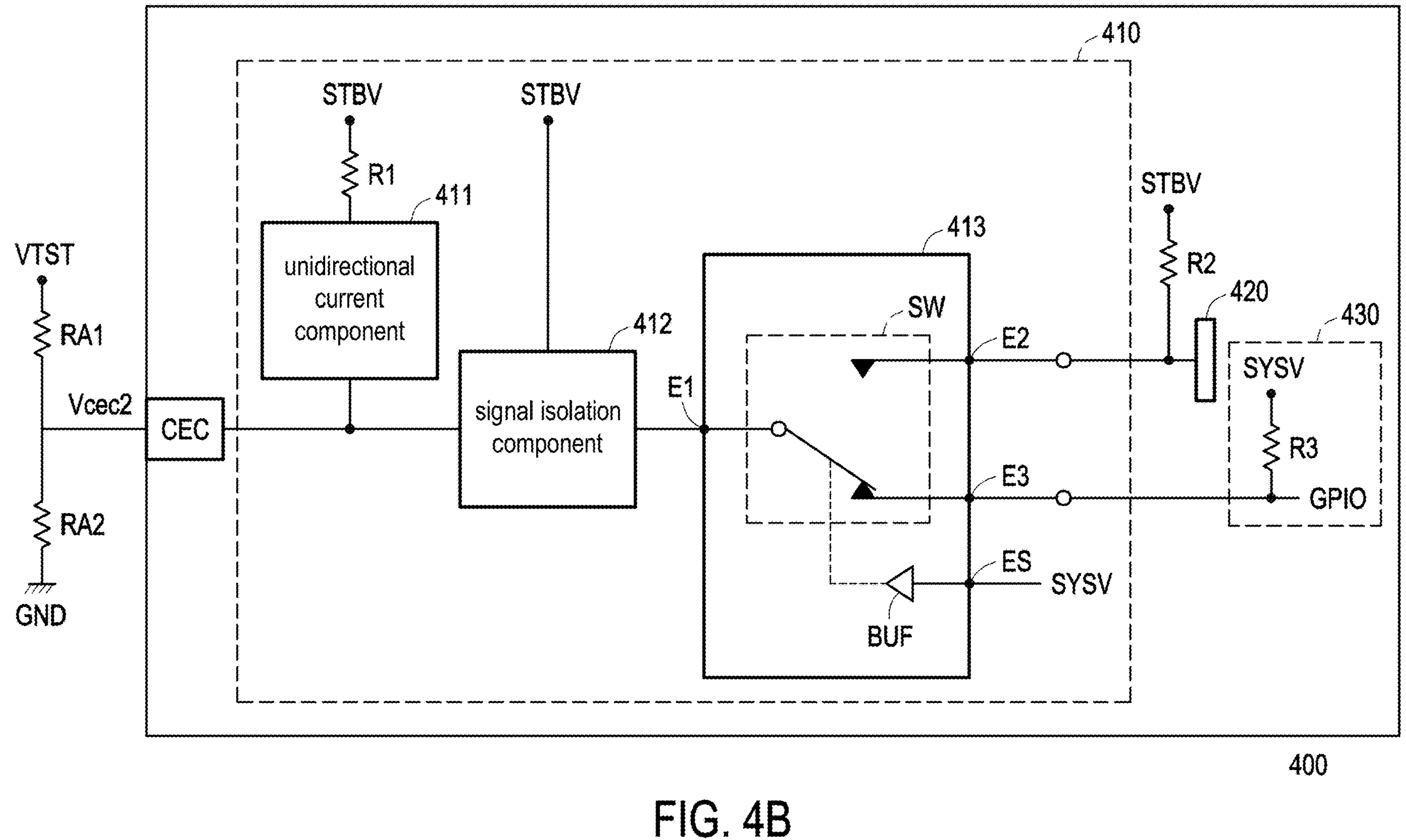
FIG. 4B illustrates a diagram of part of a circuit of an image generating device in an embodiment of the disclosure.

Please refer to FIG. 4A and FIG. 4B. FIG. 4A illustrates a schematic diagram of the connection between an image generating device and an electronic device in an embodiment of the disclosure. FIG. 4B illustrates a diagram of part of a circuit of an image generating device in an embodiment of the disclosure.

As shown in FIG. 4A, an image generating device 400 may be a projector, or any form with the high definition multimedia interface which may generate display images and be connected to other electronic device 600 (such as a DVD player), and there is no specific limitation.

Please refer to FIG. 4B, the image generating device 400 includes a communication circuit 410, a processor 420 and a signal receiver 430. The image generating device 400 has the high definition multimedia interface (HDMI). The communication circuit 410 is coupled to the pin CEC of the high definition multimedia interface, and is coupled to the processor 420 and the signal receiver 430. In this embodiment, the signal receiver 430 may be a HDMI receiver, such as an IT6802E type signal receiver, but it is not limited thereto.

The communication circuit 410 includes the first pull-up resistor R1, an unidirectional current component 411, a signal isolation component 412 and a signal switch 413. The implementation details about the communication circuit 410 are described in the aforementioned embodiments and implementations, and the descriptions thereof are omitted herein.

In this embodiment, the processor 420 is a processor for controlling the projector in a system, which is broadly interpreted as including a general processor, a central processing unit (CPU), a microprocessor, and so on, for example. The processor 420 has a second pull-up resistor R2. The second pull-up resistor R2 receives the standby voltage STBV. The processor 420 may operate normally in both the standby state and the power-on state of the image generating device 400. Moreover, the second pull-up resistor R2 is disposed outside a chip of the processor 420. The resistance value of the second pull-up resistor R2 may be adjusted by engineers. In addition, the signal receiver 430 has the port GPIO for coupling to the end E3 of the signal switch 413. The port GPIO is coupled to the third pull-up resistor R3. The third pull-up resistor R3 receives the system voltage SYSV. The signal receiver 430 does not operate when the image generating device 400 is in the standby state, and only operates when the image generating device 400 is in the power-on state. It should be noted that the third pull-up resistor R3 is, for example, 27 kilohms, which is embedded in a chip of the signal receiver 430. The resistance value may not be changed by engineers.

It is worth mentioning that the port GPIO may be a general purpose input/output port in the disclosure. For example, the IT6802E type signal receiver, which is a pin CEC.

Figures 5A, 5B, 5C:
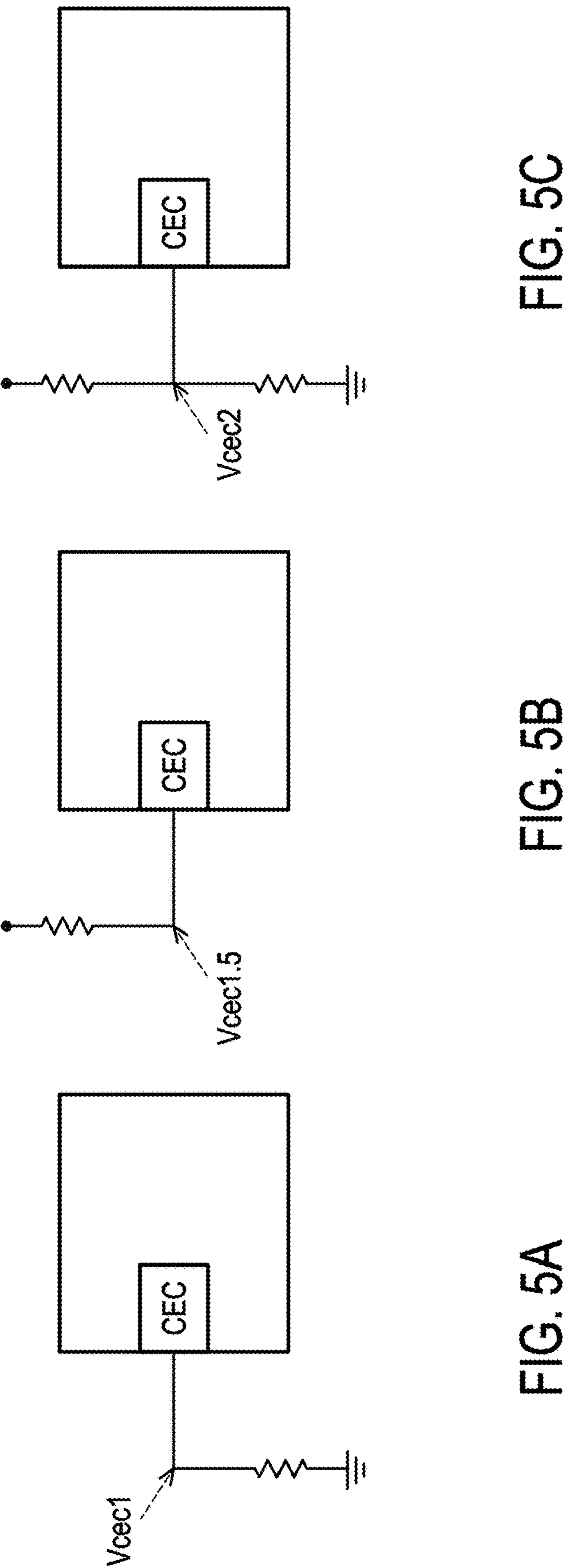
FIGS. 5A to 5C are schematic diagrams of various test modes of a high definition multimedia interface compliance test specification.

In this embodiment, in the test mode, the pin CEC may be coupled to a resistor string formed by resistors RA1 and RA2 connected in parallel. The resistors RA1 and RA2 form a voltage divider circuit for dividing a supply voltage VTST to generate the test voltage Vcec2. According to FIG. 5C and the description of related art, in this embodiment, the resistor RA1 is, for example, 27 kilohms, the resistor RA2 is, for example, 1 kilohms, and the resistance value of the resistor RA1 is greater than the resistance value of the resistor RA2. Moreover, the resistance value of the resistor RA1 may be substantially the same as the resistance value of the third pull-up resistor R3 in the signal receiver 430, which is 27 kilohms. According to the high definition multimedia interface compliance test specification, the resistor RA1 is 27 kilohms, and the resistor RA2 is 1 kilohms. By using the circuit design architecture of the disclosure, in the test item of Vcec2, when the image generating device 400 is in the standby state, referring to FIG. 2B with FIG. 4B, the equivalent resistance on the path is RA1 (27K)//R1//R2, where the mark // represents a parallel relationship. At this time, adjusting the first pull-up resistor R1 and the second pull-up resistor R2 may enable the test voltage Vcec2 to be between 0.196V and 0.274V, which meets the specification of the test voltage value. Similarly, when the image generating device 400 is in the power-on state, referring to FIG.

2A with FIG. 4B, the equivalent resistance on the path is RA1 (27K)//R1//R3 (27K), where the mark // represents the parallel relationship. At this time, adjusting the first pull-up resistor R1 may enable the test voltage Vcec2 to be between 0.196V and 0.274V, which meets the specification of the test voltage value.

To sum up, in the embodiment of the disclosure, the signal switch of the communication circuit may select the pull-up resistor connected to the pin corresponding to the standby state and the power-on state of the image generating device, and may complete the test operation of the high definition multimedia interface compliance test. Moreover, the communication circuit of the embodiment of the disclosure is equipped with the signal isolation component, which may prevent the pull-up resistors in the path of the pin from interfering with each other, and effectively prevent the external power from being reversed into the inside of the image generating device to ensure the security of the system.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A communication circuit, coupled to a pin of a high definition multimedia interface, comprising: a first pull-up resistor, an unidirectional current component, a signal isolation component, and a signal switch; wherein the first pull-up resistor receives a standby voltage;

the unidirectional current component is coupled between the first pull-up resistor and the pin;

the signal isolation component is coupled on a path between the pin and the signal switch, the signal isolation component has a first end and a second end, wherein the first end is coupled to the pin, and the signal isolation component is controlled by the standby voltage; and the signal switch is coupled to the second end of the signal isolation component, and the signal switch couples the second end of the signal isolation component to a second pull-up resistor of a processor or the signal switch couples the second end of the signal isolation component to a third pull-up resistor of a port according to a system voltage.

2. The communication circuit according to claim 1, wherein in a test mode, the pin is used to receive a test voltage.

3. The communication circuit according to claim 1, wherein the unidirectional current component limits a current on the first pull-up resistor to flow from an end of the first pull-up resistor receiving the standby voltage to the pin.

4. The communication circuit according to claim 1, wherein the unidirectional current component comprises a diode, a positive electrode of the diode receives the standby voltage, and a negative electrode of the diode is coupled to the pin.

5. The communication circuit according to claim 1, wherein the signal isolation component cuts off the path between the pin and the signal switch when the standby voltage is a reference ground voltage.

6. The communication circuit according to claim 5, wherein the signal isolation component turns on the path between the pin and the signal switch when the standby voltage is a normal voltage.

7. The communication circuit according to claim 5, wherein the signal isolation component is a switch, which is controlled by the standby voltage to be turned on or cut off the path between the pin and the signal switch.

8. The communication circuit according to claim 1, wherein the signal isolation component is a level shifter, when the standby voltage is a normal voltage, the signal isolation component is turned on, thereby shifting a voltage value of a test voltage on the pin, and providing a shifted test voltage to the signal switch.

9. The communication circuit according to claim 1, wherein the signal switch is a multiplexer, an input end of the multiplexer is coupled to the second end of the signal isolation component, a selection end of the multiplexer receives the system voltage, a first output end of the multiplexer is coupled to the second pull-up resistor of the processor, and a second output end of the multiplexer is coupled to the third pull-up resistor of the port.

10. The communication circuit according to claim 9, wherein when the system voltage is equal to a reference ground voltage, the second end of the signal isolation component is coupled to the second pull-up resistor, and when the system voltage is a normal voltage, the second end of the signal isolation component is coupled to the third pull-up resistor.

11. An image generating device, comprising: a high definition multimedia interface, a processor, a signal receiver, and a communication circuit; wherein the high definition multimedia interface has a pin;

the signal receiver has a port;

the communication circuit is coupled to the pin, comprising: a first pull-up resistor, an unidirectional current component, a signal isolation component and a signal switch; wherein, the first pull-up resistor receives a standby voltage;

the unidirectional current component is coupled between the first pull-up resistor and the pin;

the signal isolation component is coupled on a path between the pin and the signal switch, the signal isolation component has a first end and a second end, wherein the first end is coupled to the pin, and the signal isolation component is controlled by the standby voltage; and the signal switch is coupled to the second end of the signal isolation component, and the signal switch couples the second end of the signal isolation component to a second pull-up resistor of the processor or the signal switch couples the second end of the signal isolation component to a third pull-up resistor of the port according to a system voltage.

12. The image generating device according to claim 11, wherein in a test mode, the pin is used to receive a test voltage.

13. The image generating device according to claim 11, wherein the unidirectional current component limits a current on the first pull-up resistor to flow from an end of the first pull-up resistor receiving the standby voltage to the pin.

14. The image generating device according to claim 11, wherein the unidirectional current component comprises a diode, a positive electrode of the diode receives the standby voltage, and a negative electrode of the diode is coupled to the pin.

15. The image generating device according to claim 11, wherein the signal isolation component cuts off the path between the pin and the signal switch when the standby voltage is a reference ground voltage.

16. The image generating device according to claim 15, wherein the signal isolation component turns on the path between the pin and the signal switch when the standby voltage is a normal voltage.

17. The image generating device according to claim 15, wherein the signal isolation component is a switch, which is controlled by the standby voltage to be turned on or cut off the path between the pin and the signal switch.

18. The image generating device according to claim 15, wherein the signal isolation component is a level shifter, when the standby voltage is a normal voltage, the signal isolation component is turned on, thereby shifting a voltage value of a test voltage on the pin, and providing a shifted test voltage to the signal switch.

19. The image generating device according to claim 11, wherein the signal switch is a multiplexer, an input end of the multiplexer is coupled to the second end of the signal isolation component, a selection end of the multiplexer receives the system voltage, a first output end of the multiplexer is coupled to the second pull-up resistor of the processor, and a second output end of the multiplexer is coupled to the third pull-up resistor of the port.

20. The image generating device according to claim 19, wherein when the system voltage is equal to a reference ground voltage, the second end of the signal isolation component is coupled to the second pull-up resistor, and when the system voltage is a normal voltage, the second end of the signal isolation component is coupled to the third pull-up resistor, the second pull-up resistor receives the standby voltage, and the third pull-up resistor receives the system voltage.

* * * * *